US006192511B1

(12) United States Patent
Johnston et al.

(10) Patent No.: US 6,192,511 B1
(45) Date of Patent: Feb. 20, 2001

(54) TECHNIQUE FOR TEST COVERAGE OF VISUAL PROGRAMS

(75) Inventors: Gary Martin Johnston, Durham, NC (US); Mila Keren, Nesher (IL); Anthony Hayden Lindsey, Fuquay Varina, NC (US); Yael Shaham-Gafni, Haifa (IL)

(73) Assignee: International Business Machines Corporation, Armonk, NY (US)

( * ) Notice: Under 35 U.S.C. 154(b), the term of this patent shall be extended for 0 days.

(21) Appl. No.: 09/154,127

(22) Filed: Sep. 16, 1998

(51) Int. Cl.[7] .................................................. G06F 9/45

(52) U.S. Cl. .............................. 717/4; 714/38; 714/39; 714/45; 714/46; 345/339; 345/334; 345/349; 345/967; 717/2

(58) Field of Search .................................. 395/704, 701; 717/4, 1, 2; 714/38, 35, 39, 47, 45, 46; 345/333, 339, 326, 967, 968, 334, 349, 348

(56) References Cited

U.S. PATENT DOCUMENTS

| | | | |
|---|---|---|---|
| 5,307,498 | * 4/1994 | Eisen et al. | 395/704 |
| 5,511,185 | * 4/1996 | Weinbaum et al. | 714/38 |
| 5,657,438 | * 8/1997 | Wygodny et al. | 714/1 |
| 5,781,720 | * 7/1998 | Parker et al. | 714/38 |
| 5,832,270 | * 11/1998 | Laffra et al. | 395/703 |
| 5,905,856 | * 5/1999 | Ottensooser | 714/38 |
| 5,926,176 | * 7/1999 | McMillan et al. | 345/339 |
| 5,974,572 | * 10/1999 | Weinberg et al. | 714/47 |

OTHER PUBLICATIONS

Kelly C. Bourne, "Client/Server Testing Tools," Article DBMS, May 1996 [online]. DBMS Online [retrieved on Jan. 3, 2000] 10 pages.*

Retrieved from the Internet: <URL:www.dbmsmag.com9606d16.html>.*

Bieman et al, "Using Fault Injection to Increase Software Test Coverage," IEEE Proceedings., Seventh Int'l Symposium on Software Reliability Engineering, Oct. 30–Nov. 2, 1996, pp. 166–174.*

Ostrand et al, "A Visual Test Development Environment for GUI Systems," Proceedings.of ACM SIGSOFT Int'l Symp. on Software Testing and Analysis, Mar. 2–4, 1998, pp. 82–92.*

Beer et al, "IDATG: An Open Tool for Automated Testing of Interactive Software," IEEE Proceedings., COMPSAC '98 The Twenty–Second Annual Int'l of Computer Software and Applications Conference, Aug. 19–21, 1998, pp. 470–475.*

* cited by examiner

*Primary Examiner*—Kakali Chaki
*Assistant Examiner*—Tuan Q. Dam
(74) *Attorney, Agent, or Firm*—Gregory M. Doudnikoff; Marcia L. Doubet

(57) ABSTRACT

A method, system, and computer program for providing test coverage metrics in a visual programming environment. A test coverage model for visual programming is defined, which accounts for the specialized nature of visual programming, and the metrics are based on this model. The metrics are expressed in terms of elements familiar to the visual programmer, as opposed to using source code metrics. In a preferred embodiment, these elements comprise events, actions, connections, and attributes. The code implementing a visual program is instrumented according to this model, and test coverage information is gathered as the instrumented program executes.

12 Claims, 5 Drawing Sheets

TECHNIQUE FOR TEST COVERAGE OF VISUAL PROGRAMS

CROSS-REFERENCES TO RELATED INVENTIONS

This application is related to U.S. patent application Ser. No. 09/154,231 entitled "Presentation of Visual Program Test Coverage Information"; U.S. patent application Ser. No. 09/154,126 entitled "Visual Program Runtime Performance Analysis"; and U.S. patent application Ser. No. 09/154,121 entitled "Presentation of Visual Program Performance Data", all assigned to International Business Machines Corporation (IBM) and filed concurrently herewith.

BACKGROUND OF THE INVENTION

1. Field of the Invention

The present invention relates to computer software, and deals more particularly with a method, system, and computer program for providing test coverage metrics in a visual programming environment. A model is defined for test coverage in the visual programming environment, and the metrics are based on this model.

2. Description of the Related Art

Testing is an important part of the software development cycle. The motivation for testing software is to raise the quality and reliability of the program, and to establish confidence that the program does what it is supposed to do. Assuming that programs contain errors, the purpose of testing is to find as many of the errors as possible. Thus, testing may be considered as the process of executing a program with the intent of finding errors.

Testing is a costly and time-consuming activity. Finding all the errors in a program is virtually impossible, because to do this, one must test the program for all possible inputs in all possible states—which, except for the most trivial of programs, is a prohibitively large number. The more tests that are executed, the higher the confidence level in the quality of the program code, but with a corresponding increase in time and money invested in the testing process. Since there can be no proof that, at a point in time, the program has no more bugs, the question arises: how much testing is sufficient? Techniques and tools have been developed to assist in evaluating the sufficiency of the testing. The main technique for demonstrating that testing has been thorough is called test coverage analysis.

Test coverage analysis is discussed in detail in "Software Testing Techniques", 2nd edition, by Boris Beizer, published by International Thomson Computer Press (1990). Simply stated, the idea of test coverage analysis is to create, in some systematic fashion, a large and comprehensive list of tasks corresponding to the program under test. This list of tasks is then compared to the tasks covered in the actual test, from which various metrics can be determined. The most widely practiced coverage technique is code coverage, where the list of tasks to be covered is derived statically from analysis of the syntactic properties of the program code. For example, statement coverage and branch coverage are typical code coverage metrics. Statement coverage is concerned with counting the number of statements of program code that are executed during a test, and comparing this number to the total number of statements in the program. Branch testing, or branch coverage, is concerned with testing each branching statement (e.g. an IF . . . THEN . . . ELSE statement, or a SELECT statement) under conditions that will cause specific branches to be taken. The branch coverage metric then indicates how many of the possible branches in the code have been exercised during the test.

Component-based visual programs introduce a new challenge to measuring code coverage. (The term "visual program" is used herein as a shorthand for "component-based visual program".) Visual programs are different from conventional programs in several important ways. Because of these differences, known test coverage techniques cannot be applied to this new programming domain in a way that provides meaningful results—and without the ability to define test coverage metrics for visual programs, it is difficult to assess program quality and reliability, which may negatively affect the acceptance of such programs by end-users.

A first difference between visual programs and conventional programs relates to the types of building blocks used by a programmer in creating a program, and a second difference lies in the source of those building blocks. Visual programs are graphically constructed primarily from pre-built components, equivalently referred to as "parts", which are typically supplied (along with the code which implements those components) by the vendor of the visual programming environment (or by a third-party vendor of such parts). Examples of visual programming environments are VisualAge for Java and VisualAge Smalltalk, from the International Business Machines Corporation ("IBM"). VisualAge is a registered trademark of IBM, and Java is a trademark of Sun Microsystems, Inc. A conventional programmer, on the other hand, typically writes program code himself using textual source-code statements of a programming language such as the C language. The source code statements specify data definition, as well as all operations on the data that are required in order to achieve the desired end result. Alternatively, in an object-oriented programming environment, the object-oriented programmer writes programs in a programming language such as Smalltalk, by creating or re-using objects and methods. Because the object-oriented programmer writes programs using source language coding statements, object-oriented programming will be considered as a "conventional" programming environment for purposes of the present invention. The visual programmer writes a program by selecting from the pre-built components (often by selecting visual representations of these components), and specifying how, and in what sequence, the selected components will interact. The visual programming environment software then generates executable code that will implement the specified interactions.

This generated code is constructed by the visual programming environment, and thus it can be expected that it correctly implements the components and interactions specified visually by the visual programmer. Testing this generated code during testing of the visual program is therefore likely to be a redundant effort, wasting time and resources that could be better spent in testing the program elements created by the visual programmer. Further, if this generated code is included in existing test coverage metrics (i.e. measurements computed in terms of statements executed, or branches taken), the resulting statistics will obscure information related to how much of the visual program written by the visual programmer has been covered. In addition, because visual programs are written using components and interactions, metrics expressed in terms of statements and branches do not provide a useful coverage measure for testing this type of program. And, if coverage expressed in these metrics indicates insufficient testing, there is no correlation to the components and/or interactions which are the ones needing more testing. Finally, showing the visual programmer which source code statements were (or were not) covered requires him to work at a different level (i.e. generated text, using source code in a programming language such as C or Smalltalk) during testing than that in which he worked while programming (i.e. visually, using parts and interactions), which may be confusing, error prone, and inefficient.

Accordingly what is needed is a technique for measuring test coverage of visual programs. This technique must account for the specialized nature of visual programs, which are typically created by graphically specifying interactions between pre-built components. The metrics must provide information that is useful to the programmer working in this enviroment, indicating test coverage in terms of elements that correspond to a visual program.

SUMMARY OF THE INVENTION

An object of the present invention is to provide a technique for measuring test coverage of a visual program.

Another object of the present invention is to provide this technique by defining a coverage model that accounts for the specialized nature of visual programs.

Yet another object of the present invention is to provide test coverage information using metrics that are based on this coverage model.

It is another object of the present invention to provide this technique using metrics expressed in terms of the elements used by a visual programmer.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a software-implemented technique for providing test coverage metrics in a computing system having a capability for visual programming. This technique comprises instrumenting a selected one of one or more visually-created programs according to a visual programming test coverage model, and gathering test coverage information using this instrumented program. This technique further comprises initializing the test coverage metrics, and the instrumentation further comprises locating one or more elements of interest according to the coverage model, and adding a code hook for each of these located elements. Preferably, a user of the computing system may select elements of interest from among a plurality of elements defined according to the coverage model as part of this instrumentation process. Gathering test coverage information further comprises executing one or more tests against the instrumented program, and logging an entry upon detection of any of the code hooks. Preferably, this logged entry comprises an indication that the located element corresponding to the detected code hook has been covered. The coverage model preferably comprises coverage metrics based on a plurality of visual elements, where this plurality comprises events, actions, connections, and attributes. The computing system may reside in a computer network.

The present invention will now be described with reference to the following drawings, in which like reference numbers denote the same element throughout.

DESCRIPTION OF THE PREFERRED EMBODIMENT

Figure 1:
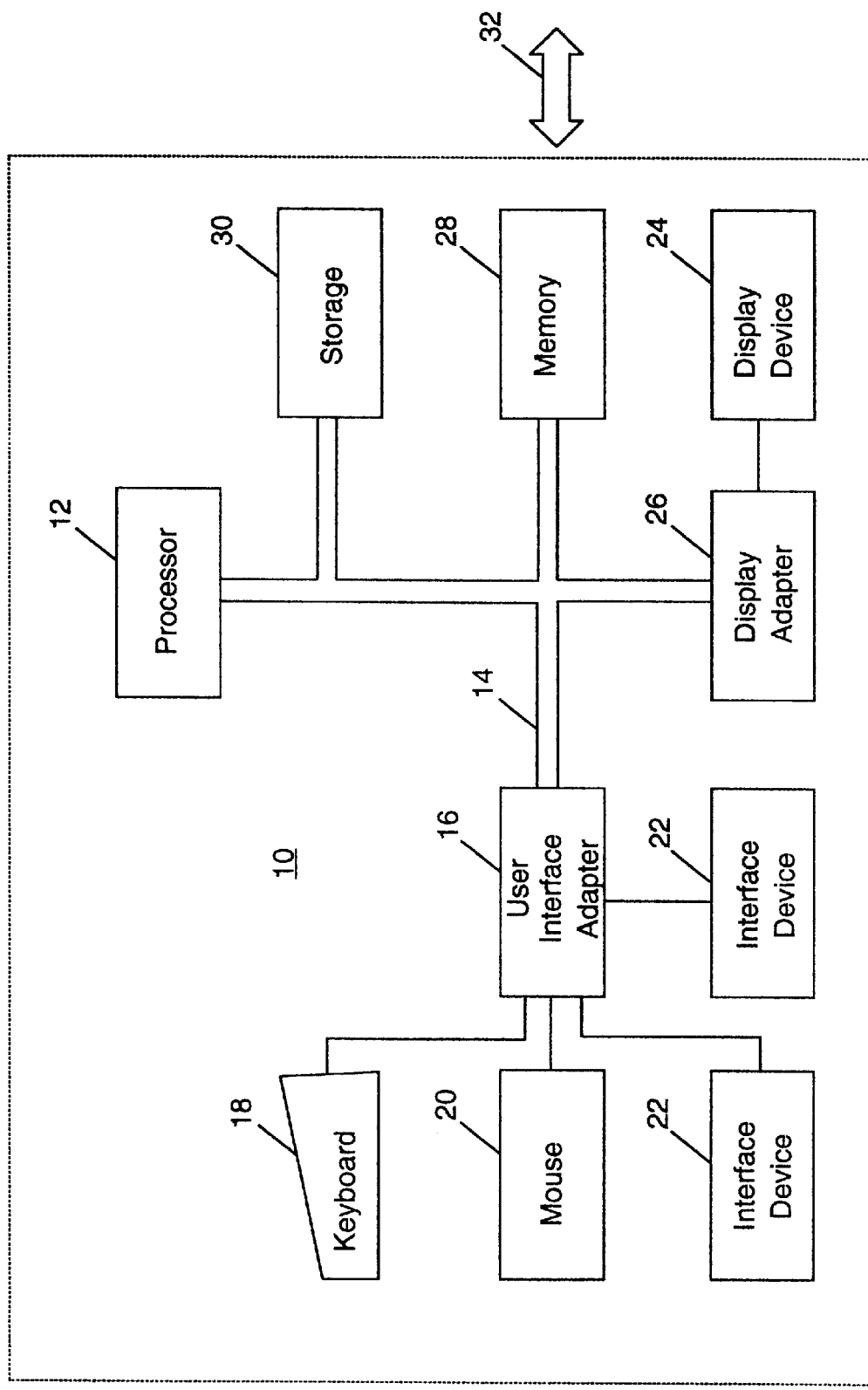
FIG. 1 is a block diagram of a computer workstation environment in which the present invention may be practiced.

FIG. 1 illustrates a representative workstation hardware environment in which the present invention may be practiced. The environment of FIG. 1 comprises a representative computer or intelligent workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate via a communications channel 32 with other computers or networks of computers. The workstation 10 may be associated with such other computers in a local area network (LAN) or a wide area network (WAN), or the workstation 10 can be a client in a client/server arrangement with another computer, etc. All of these configurations, as well as the appropriate communications hardware and software, are known in the art.

Figure 2:
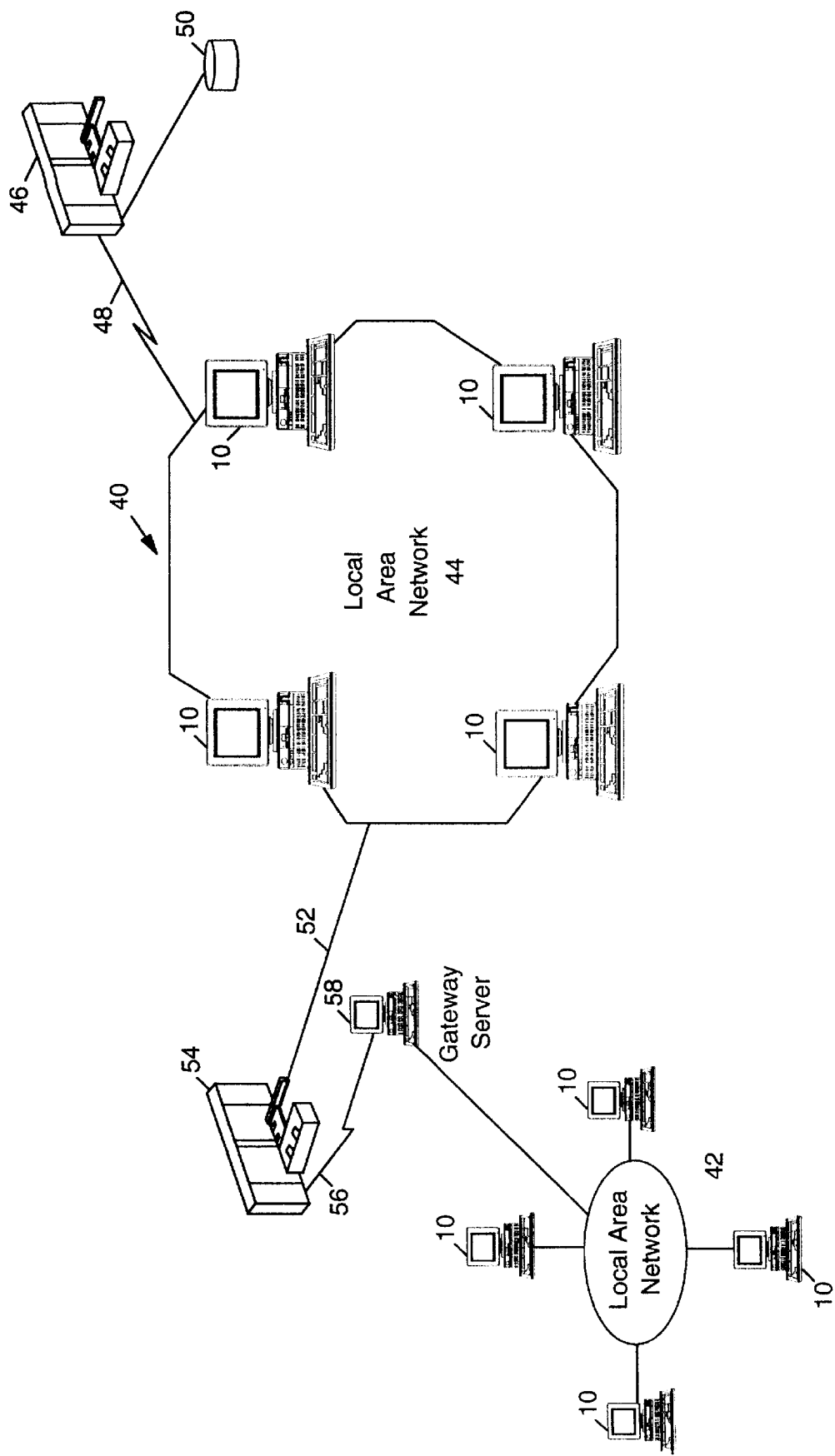
FIG. 2 is a diagram of a networked computing environment in which the present invention may be practiced.

FIG. 2 illustrates a data processing network 40 in which the present invention may be practiced. The data processing network 40 may include a plurality of individual networks, including LANs 42 and 44, each of which includes a plurality of individual workstations 10. Alternatively as those skilled in the art will appreciate, a LAN may comprise a plurality of intelligent workstations coupled to a host processor.

Still referring to FIG. 2, the data processing network 40 may also include multiple mainframe computers or servers, such as a mainframe computer 46, which may be preferably coupled to the LAN 44 by means of a communications link 48. The mainframe computer 46 may be implemented utilizing an Enterprise Systems Architecture/370, an Enterprise Systems Architecture/390 computer available from IBM, etc. Depending on the application, a midrange computer, such as an Application System/400 (also known as an AS/400) may be employed. "Enterprise Systems Architecture/370" is a trademark of IBM; "Enterprise Systems Architecture/390", "Application System/400", and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/ communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically accessed by the microprocessor 12 of the workstation 10 from long-term storage media 30 of some type, such as a CD-ROM drive or hard drive. In a client-server environment, such software programming code may be stored with storage associated with a server. The software programming code may be embodied on any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

The client-server environment in which the present invention may be used includes an Internet environment, or an intranet environment. Additionally, the present invention may be practiced in an environment structured according to a three-tiered architecture, whereby a clientserver environment is extended by adding data repositories as a third tier (such that the server now occupies the middle tier).

The preferred embodiment of the present invention will now be discussed with reference to FIGS. 3 through 5.

In the preferred embodiment, the present invention is implemented as a computer software program. The program code of the preferred embodiment may be implemented as objects (classes and methods) in an object-oriented programming language such as Smalltalk, or as instructions in a conventional procedural programming language (such as the C programming language).

The test coverage technique of the present invention defines a model for test coverage in the visual programming environment, which takes into account the specialized nature of visual programs. A preferred embodiment for implementing test coverage metrics using this model is described.

Visual programs are created by specifying connections, or interactions, between components, or parts. The visual programmer typically does this by drawing each connection using a specialized "connection" graphical object supplied by the programming environment software. This connection object is used to signify information about component interactions, such as which component is the source, or input, and which is the target, or output. Different programming environments may use alternative methods of indicating connections, without deviating from the scope of the present invention.

As discussed earlier, it is not useful to calculate test coverage metrics for a visual program (or the visual parts of a mixed visual and conventional program) based on the number of statements executed, the number of branches covered, or other source-code-based metrics currently used for testing conventional programs. The test coverage model of the present invention is based upon elements that are familiar to the visual programmer, so that metrics resulting from use of this coverage model will provide him with beneficial information. In the preferred embodiment, these elements are parts, interfaces, and connections. Because many parts are supplied by the provider of the visual programming environment (or a third party), and have therefore already been tested, the test coverage model of the preferred embodiment concentrates on interfaces and connections. Alternatively, parts may be included in the test coverage model without deviating from the inventive concepts of the present invention. This may be useful, for example, if the visual programmer creates new primitive parts, for which he provides new (untested) code.

A part may be equivalently referred to as a component, an object, etc. Examples of parts are: an application that implements a graphical user interface ("GUI"); a graphical pushbutton that can be used in the GUI to signify that a connection should fire; and a file or data repository that will be accessed. Parts are represented to the visual programmer using a graphical representation such as an icon, which may optionally be annotated with the part's name (e.g. by using a textual label). A part may have subparts, which may in turn have subparts, etc. For example, if visual programming is used to create the GUI portion of a program, one part may represent the window or screen that will be presented to the user of the resulting program. Subparts of the window part would include the graphical objects displayed in that window. If one such subpart is a drop-down list, each choice defined for the list may be a subpart of the list part. The terms "part" and "subpart" are used interchangeably hereinafter unless otherwise specified.

Parts have an interface, which defines one or more ways of accessing, or interacting with, that part. For purposes of the preferred embodiment, a part interface will be discussed in terms of attributes of the part, events the part produces or signals, and actions that the part can perform upon request. Collectively, these aspects of the part interface may be referred to as "features" of a part. Other aspects of a part interface may be used in the test coverage model of the present invention, without deviating from the inventive concepts defined herein. Examples of part attributes are: a field of the part, when the part represents a data structure such as a list, ordered collection, etc.; or a label of a pushbutton, which may, e.g., change between "Stop" and "Go" depending on the state of the application. Examples of events are: change in the value of an attribute; a user input (such as clicking on a graphical pushbutton); etc. Examples of actions are: updating a file or data repository; printing; displaying data on the GUI screen; etc.

A connection connects a feature of a source subpart to a feature of a target subpart. For purposes of the preferred embodiment, the following types of connections are considered: event-to-action (which are directed connections), and attribute-to-attribute (which may be directed connections, or bi-directional connections). Bi-directional attribute-to-attribute connections are used to synchronize data in two places. Examples of the connection types are discussed below with reference to FIG. 3. Other types of connections may be used in the test coverage model without deviating from the inventive concepts of the present invention.

Figure 3:
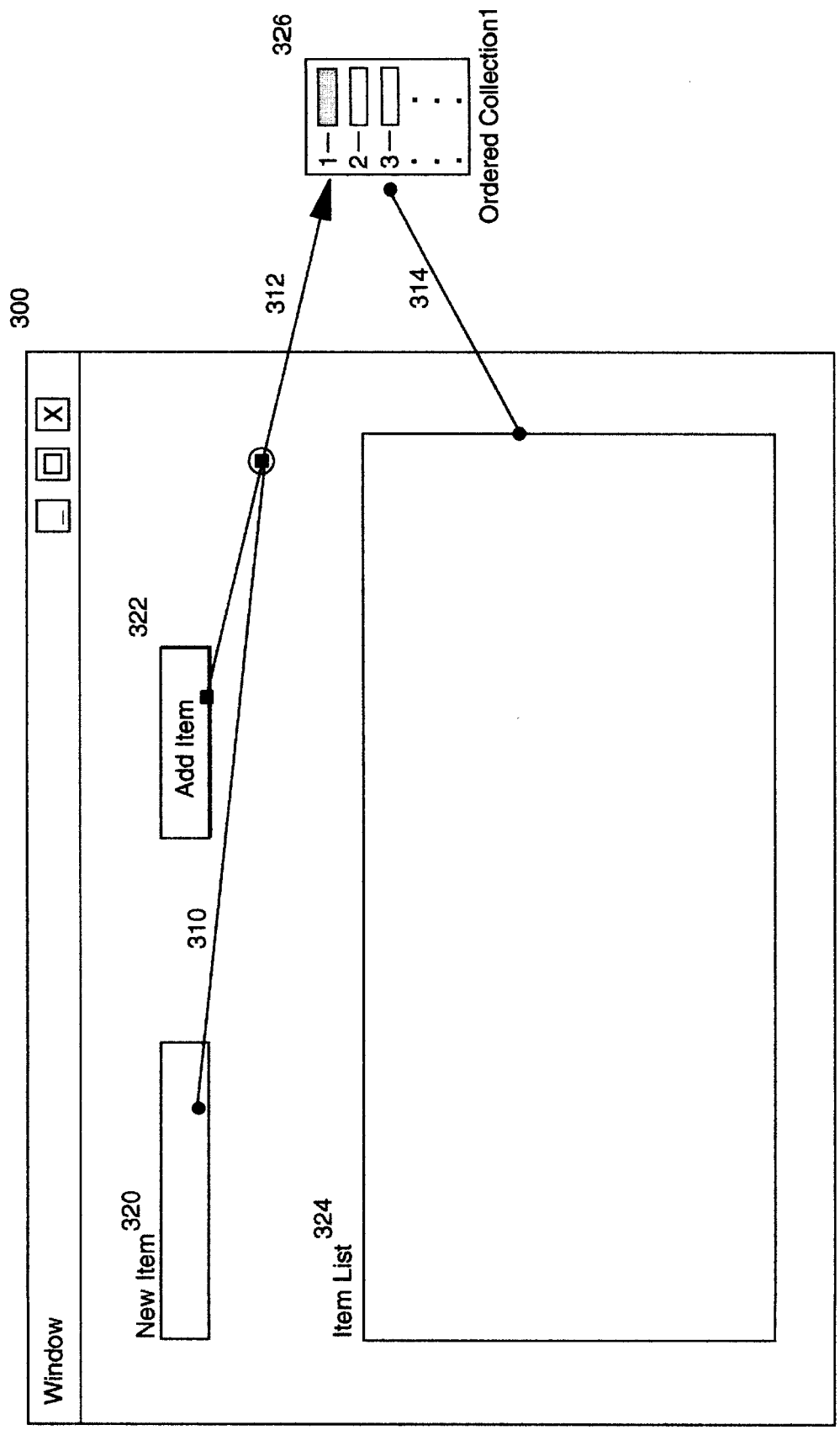
FIG. 3 illustrates a simple visually-created program.

FIG. 3 shows a graphical representation 300 of a simple visually-created program which includes three connections 310, 312, 314. This visually-created program itself is a part, and includes four subparts 320, 322, 324, 326. Connection 310 is an attribute-to-attribute connection from the "New Item" part 320 to the event-to-action connection 312, which connects the "Add Item" pushbutton part 322 to the "Ordered Collection 1" part 326. Connection 314 is an attribute-to-attribute connection between the "Item List" part 324 and part 326. By connecting the "clicked" event (not shown) of the pushbutton 322's interface to the "add:" action (not shown) of the ordered collection 326's interface, the visual programmer has specified that when connection 312 fires, the corresponding event-to-action behavior occurs. In this example, the "add:" action requires a parameter, containing the element to be added to the ordered collection 326. The input parameter is obtained from input data that the end-user will enter using the entry field in New Item part 320, which is then passed as a parameter of the connection 312. Connection 314 indicates that the items in the "Ordered Collection 1" part 326 are displayed in the Item List part 324. Connection 314 is a bi-directional connection, so that a change in the "Ordered Collection 1" part 326 will cause an update to the data displayed in the Item List part 324, and vice versa. The visual programmer may create this program by dragging the parts 320, 322, 324, and 326 onto a window of a visual programming environment (for example, from an 151 available-parts palette), and then connecting those parts using connections 310, 312, and 314. A pushbutton part 322 is predefined, as is its interface. Similarly, the entry field part 320, the list part 324, and the ordered collection part 326, as well as their interfaces, are predefined. The visual programmer selects a feature from a redefined interface by popping up a window (or selecting from a drop-down list, etc.) in which the features of the part are displayed, and selecting a feature from this interface list. Suppose "add:" is a choice in the interface list of the ordered collection part, provided by the visual programming environment as a way of enabling the end-user to add new elements to an ordered collection. The visual programmer may choose this action by selecting the "add:" entry from the interface list. This visually-created program will then add an entry (passed as a parameter, as stated above) to the ordered collection each time the pushbutton is clicked. While FIG. 3 shows a simple example of a visual program, more complex programs can be created in an analogous manner. Note that the way in which the visual program is created does not form part of the present invention, and the above description is merely indicative of one way such a program can be created.

As previously discussed, a significant amount of the code executed when a user invokes a visually-created program is generated or pre-built code, which has already been tested. The visual programmer specifies which parts interact, the sequence in which they interact, what triggers invocation of their interaction, and what happens when they interact—i.e., all the details of connections. Actions may be written by the visual programmer, which contain code that will be activated when a connection fires. The code implementing these actions must be tested, as well as the other aspects of connections. Thus, the coverage model defined by the preferred embodiment includes tasks for covering the following elements: connections, attributes, events, and actions.

A test coverage model can be viewed as a collection of coverage tasks, where each coverage task is a Boolean predicate. The subject of the predicate is an entity (concrete or abstract) of the program. Examples of subjects are: statement no. 5 in procedure print, variable x in function exp(y), connection 9 in part ReceiptView. The predicate expresses an attribute or quality of the subject. Examples of predicates are: statement no. 5 in procedure print was executed, variable x in function exp(y) was initialized before it was used, connection 9 in part ReceiptView was fired. A predicate is evaluated with respect to the execution of a set of tests on the program. The predicate can be either true, if it is satisfied, or false. When the predicate is true, the corresponding coverage task is said to be covered. Usually a coverage model is a coverage task (or several tasks) defined on an enumeration of similar subjects. The model can be expressed as $\{(x, n, B) | task\ x\ on\ subject\ n\}$. In this syntax, "x" identifies a specific coverage task. "x" may be represented using the values $\{1 \ldots X\}$, where a number is assigned to each type of coverage task and the total number of such tasks is some number "X". "n" identifies a specific subject, and takes on the values $\{1 \ldots N_x\}$, where "$N_x$" is the total number of subjects that are specified for task "x". Alternatively, "n" may be an identifier which corresponds to a name that has been assigned to represent code elements, instead of a number. "B" corresponds to the Boolean value TRUE or FALSE for the expression on the right-hand side, and has the default value FALSE before tests have been executed. The entries in this collection then represent, at a point in time (after execution of a portion of the tests), the test coverage of a particular program expressed in terms of the various types of coverage tasks that have been monitored.

The test coverage model defined in the present invention preferably uses this approach for representing coverage task status. The types of tasks to be covered in the preferred embodiment of this coverage model are connections, attributes, events, and actions, as previously stated. As an example of how the coverage task entries are used to represent coverage status, consider the coverage task concerned with connections. Assume that (x=1) is used for these entries, in which case "$N_1$" represents the total number of connections in the visual program under test. By counting the number of coverage task entries that have the values (x=1) and (B="TRUE"), and comparing this result to $N_1$, the percentage of connections that have been covered thus far in the testing can be determined. Suppose the coverage task representing signalling of events is associated with (x=2). Then to calculate the percentage of event signallings that have been tested, the number of coverage task entries having (x=2) and (B="TRUE") can be counted, and compared to the value of $N_2$. Similar comparisons can be made when the type of coverage task is execution of an action, changing of an attribute value, etc. Because attributes can be at either end of an attribute-to-attribute connection, coverage for attributes can be further refined in terms of whether the attribute was the source or target of the connection. For example, one type of coverage task may indicate whether the attribute has changed in its role as source, another may indicate that it has changed in its role as target, another may indicate that it has changed in both roles, etc. For bi-directional connections, a separate coverage task may be used to indicate the firing status of the connection in each direction. A multi-dimensional array can be used to store the members of this test coverage model collection (e.g. in memory, or in a data repository), using techniques which are well known to one of ordinary skill in the art. In one aspect of the preferred embodiment, a structure such as a Smalltalk dictionary may be used to store the coverage task entries, enabling fast and efficient location of a particular entry for retrieval and/or update of its associated test coverage status value.

The technique with which test coverage information is collected according to the preferred embodiment will now be discussed with reference to FIGS. 4 and 5.

Figure 4:
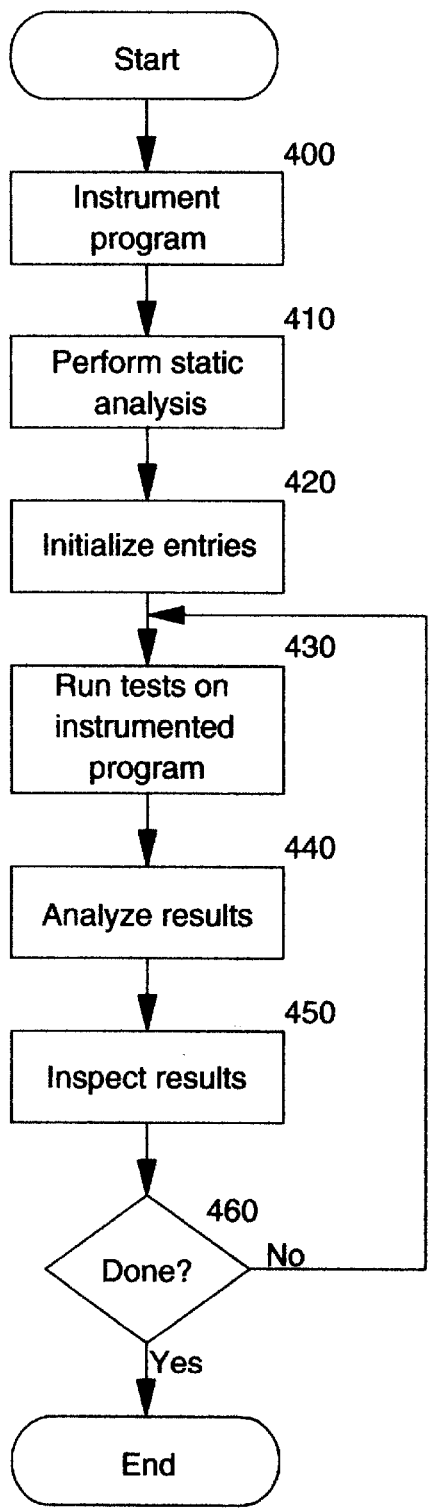
FIG. 4 illustrates a flowchart depicting a high-level flow of using the present invention to perform tests and analyze test coverage.

FIG. 4 illustrates how the test coverage technique of the present invention is used during the testing process. The process begins at Block 400, by instrumenting the visually-created program, which will cause the test coverage information to be gathered when tests are executed against this program. This instrumentation process comprises adding code hooks in appropriate locations within the code that implements the visual program.

Techniques for adding hooks into code are well known in the art. In the preferred embodiment, this is accomplished by adding a small piece of code in the appropriate place for each element of interest. In an object-oriented implementation, this comprises adding a message, or method invocation. In a procedural programming implementation, this comprises adding a function or subroutine call. The method or subroutine which is invoked in response to such a code hook is described in more detail with reference to FIG. 5. In general, code invoked in response to a hook may perform any action desired by the programmer who writes the hooked code. For purposes of the present invention, the invoked code logs the fact that the invoking element has been executed.

The appropriate place for adding each code hook depends on the type of element being instrumented, and accounts for the manner in which each element type is implemented in the code that was generated for the visual program. In the preferred embodiment, actions have been implemented as Smalltalk methods (or Java methods, when the underlying code of the visual program uses the Java language) written by the visual programmer; event signallings have been implemented in the visual program using a specific method invocation syntax; attributes have been implemented as instance variables, with one method for setting the value and another method for getting the value; and connections have been implemented by specification of a method invocation.

Accordingly, to instrument an action, the present invention inserts a code hook at the beginning of the action's code. To instrument an event signalling, the event signalling method name must be known. As an example, the following syntax may be used: "self signalEvent: eventName", where "signalEvent" is the name of the event signalling method and "eventName" changes to represent the particular type of event. Preferably, such a method will be defined at a high level in a class hierarchy, and inherited by classes lower in the hierarchy. Then, a code hook can be inserted into the code implementing this method. To instrument an attribute, it is necessary to instrument the methods which perform the "set" and "get" operations on the attribute's value. For each attribute, these methods are located, and a code hook is inserted into the method code. Alternatively, instead of instrumenting the set method, a code hook can be inserted wherever the "changed" event for the attribute is encountered in the code (i.e. where "changed" is the "eventName" in the event signalling instrumentation described above). To instrument a connection, the method name which is invoked for each connection type must be known, similar to the event signalling approach. A code hook is then inserted into each of these methods.

The method names used in the above description may differ in actual implementation, and the methods implementing the element types may differ from the techniques described. One of ordinary skill in the art will recognize that what is required is to know what code the visual programming environment generates (e.g. the names of methods or subroutine calls that are generated) for each element type of interest. The instrumentation technique can then be adapted to insert the code hooks into the proper places of that generated code.

Block 410 performs a static analysis of the visual program. In the preferred embodiment, the static analysis process comprises locating elements of interest by sending messages to each part of the visual program, where one message asks a part to return its connections, another asks the part to return its events, etc. Because the program under test is itself a part, a message can be sent to this part, asking it to return the collection of parts it uses. The messages requesting element information are then sent to each part in this collection. Messages of this type are available to the developer as part of a visual programming environment, and creation of such messages does not form part of the present invention. During this process, the number of elements of each type can be determined.

Block 420 initializes the entries in the test coverage model that are used to keep track of which elements have been tested. As previously stated, in the preferred embodiment these elements are connections, events, attributes, and actions, and they are found using the static analysis of Block 410. A multi-dimensional array or dictionary structure may be used to store the entries which are created, as previously discussed. The initialization process sets a flag or field of each entry to "FALSE" to indicate that the corresponding element has not yet been covered.

It will be obvious that the processes of Blocks 400 through 420 may be intermingled without deviating from the inventive concepts of the present invention, and that they have been shown as separate in FIG. 4 for the purpose of illustrating their distinct functionality. For example, as the static analysis process locates the elements, the corresponding coverage task entry for each element may be initialized.

The actual execution of the tests, and gathering of test coverage information, occurs in Block 430 of FIG. 4. Note that while Block 430 is shown here as sequentially following the processes of Blocks 400 through 420, it may be that some period of time elapses before the process of Block 430 begins. This would be the case, for example, where program testing is performed over a number of days, or in a number of separate test runs. When the visual program is not being changed during the testing process, it is not necessary to repeat the function of Blocks 400 through 420 each time a new test run begins, and therefore the testing process may begin at Block 430. It will be obvious to one of ordinary skill in the art how the function of Blocks 400 through 420 may be skipped in such a situation. For example, the preferred embodiment may begin by asking the tester whether or not he wishes to execute these processes. When this query has a positive response, Blocks 400 through 420 are executed; otherwise, they are not. If the tester wishes to reset the test coverage status entries (for example, if he determines that previously-executed tests were flawed, and wishes to begin the testing all over again), then he may be provided with the option to begin at Block 420.

Block 440 of FIG. 4 shows that the results of test execution are analyzed after running tests on the instrumented program. This comprises processing an execution trace, which has been created by the process of FIG. 5 during execution of the instrumented program. As elements of interest are located in the trace, the corresponding coverage task entry is updated to set its coverage status to "TRUE". (Alternatively, the task entry may use a counter instead of a Boolean, where this counter is incremented each time the corresponding element is located in the trace.)

Figure 5:
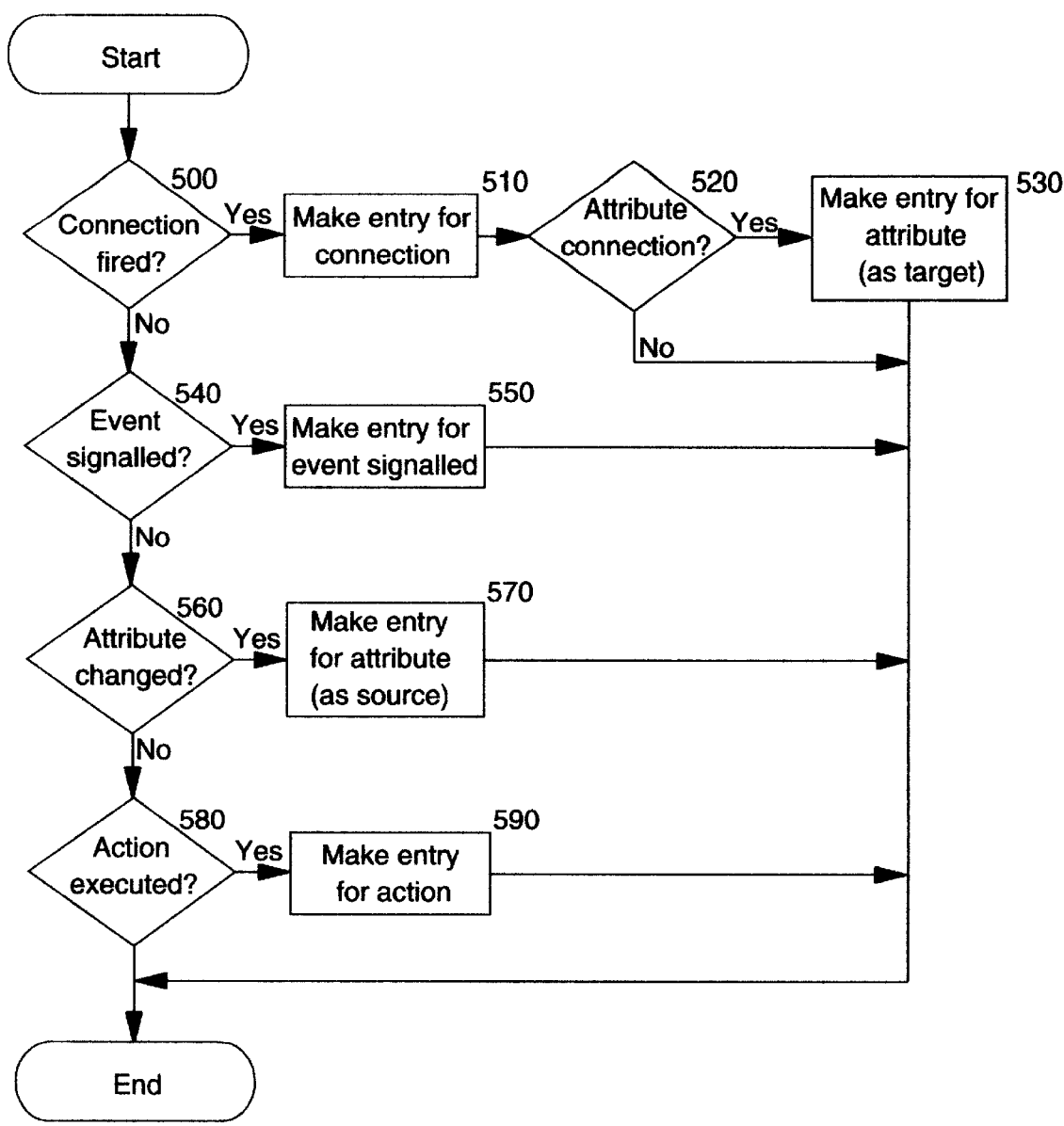
FIG. 5 illustrates a flowchart depicting logic that expands on the level of detail in FIG. 4, showing operation of a preferred embodiment of the present invention.

In an alternative aspect of the preferred embodiment, the entries created during the process of FIG. 5 may directly update the corresponding test coverage task entry, without creating a trace. In that case, the analysis process of Block 440 is not required.

At Block 450, the user may inspect the results of test coverage, to review the progress he has made. The inspection of results may be done in a number of ways without deviating from the inventive concepts of the present invention. The coverage task entries may be processed sequentially, and a line of text displayed which presents a human-readable interpretation of the entry. For example, for a coverage task entry indicating that an event named "pushbutton1 clicked" has been signalled, text such as "The event 'pushbutton1 clicked' has been signalled," may be displayed (or printed or written to a file, equivalently). It may be desirable to allow the tester the option of seeing only those tasks that have been covered, only those tasks that have not been covered, or both. Alternatively, the coverage task entries may be displayed using the novel technique described in the related application titled "Presentation of Visual Program Test Coverage Information", which is incorporated herein by reference.

Block 460 then asks whether the tester is done with the testing and results analysis/inspection process, and if so, the process of FIG. 4 ends; otherwise, control returns to Block 430 to perform additional testing. It will be obvious to one of ordinary skill in the art that this represents a high-level view of the testing and analysis process. Any number of tests may be performed on an instrumented program (at Block 430) before the test coverage results are analyzed and inspected.

FIG. 5 expands on the level of detail shown for Block 430 of FIG. 4. As is well known in the art, running a test on a program comprises running the program in a manner that simulates normal execution. Execution of the normal program code does not form part of the present invention, and uses existing techniques. Therefore, it will not be described further herein. In the present invention, the normal program code has been augmented with code hooks, as previously described. These code hooks are executable code which, when encountered, execute to cause invocation of testing-specific code. FIG. 5 illustrates the logic that is executed each time a code hook is encountered. Upon completion of the logic in FIG. 5, execution of the program continues with the next executable program instruction.

Blocks 500, 540, 560, and 580 ask what type of code element the hook was invoked for, and perform the corresponding processes required to properly log execution of elements of interest according to the test coverage model. A number of different ways of making the determinations of these blocks may be used, without deviating from the inventive concepts of the present invention. The preferred embodiment makes this determination during execution, as part of the process of FIG. 5, by querying the program stack to determine what type of code element is currently being executed. Alternatively, at the time the code hook is being inserted (see the above description of FIG. 4), an indication may be made (e.g. by including code to specify a parameter on the code hook itself) that specifies the type of program element for which the hook is being inserted. Such techniques are well known in the art.

Block 500 asks whether the code element represents firing a connection. If the answer to this test has a positive response, processing continues at Block 510; otherwise, control transfers to Block 540. At Block 510, an entry is logged to indicate that this connection has now fired. As discussed above with reference to FIG. 4, an execution trace may be created as part of this logging process, or alternatively, test coverage tasks may be updated directly. When an execution trace is being created, the process of Block 510 comprises writing an entry into the trace indicating that this particular connection has fired. When the coverage task entries are being updated directly, the process of Block 510 corresponds to locating the entry for this particular connection, which is preferably stored in the form (x, n, B) as previously discussed, and setting the Boolean value of "B" to TRUE in this entry. (Note that this Boolean value may have already been set to TRUE if this code element was previously executed during the testing process. Alternatively, a counter may be used instead of a Boolean value, where the counter is incremented each time an element is covered.) The manner in which a particular code element is identified (i.e. using an identifier, or a corresponding number) for purposes of writing a trace entry or locating its log entry does not form part of the present invention. Techniques for writing an entry in a trace and for locating an entry for updating are well known in the art.

Block 520 asks whether this connection is an attribute connection. If not, the processing for this invocation of a code hook is complete, as indicated by ending the logic of FIG. 5. Otherwise, Block 530 logs an entry (using either the trace or the test coverage task, as described above) to indicate that the target attribute for this connection has also been covered.

Block 540 is reached when the code hook that invoked the processing of FIG. 5 was not a connection firing. Block 540 asks if it was an event being signalled. If the answer to this test has a positive response, processing continues at Block 550; otherwise, control transfers to Block 560. At Block 550, a trace or coverage task entry is made/updated to indicate that this event was signalled.

Control reaches Block 560 when the code element being executed was not firing a connection or signalling an event. Block 560 asks whether it is a code element for changing an attribute. If this test has a positive response, processing continues at Block 570; otherwise, control transfers to Block 580. At Block 570, a log entry is made to indicate that an attribute has changed in its role as source. Again, making this log entry comprises either writing a trace record or updating the appropriate test coverage task.

At Block 580, a test is made to determine whether the code element being executed was execution of an action. If this test has a negative response, then is may be that there is some other type of code element which is not of interest for the test coverage metrics defined by this coverage model. In that case, the process of FIG. 5 ends without logging any coverage information. Otherwise, Block 590 logs an entry indicating that this action has now been covered.

In an optional enhancement of the preferred embodiment, the tester (who may be the visual programmer) may be allowed to focus the testing on some subset of the elements of the test coverage model. For example, he may be interested only in which connections fire, but not in events, actions, or attributes. Or, he may be interested only in a subset of the parts of the program, and what happens to the parts in that subset. In this alternative embodiment, the process of FIG. 4 may include asking the tester which of the elements he wishes to monitor. Techniques for presenting options in this manner are well known in the art, as are the techniques for accepting the selections of the response, and factoring those selections into the logic of program operation. The process of Block 400 may be optimized by not instrumenting the program except in the areas pertinent to the selected elements (in which case the process of FIG. 5 will not be invoked for those elements that were not instrumented), and the process of Block 420 may be optimized by not initializing entries for elements that have not been selected. In addition, the process of Block 410 may be further enhanced by requesting only the parts which are of interest to the tester to return their connections, and only doing this if the tester wishes to see connection coverage information. Similarly, parts of interest will be requested to return their attributes, actions, and events only if the tester is interested in monitoring the coverage thereof. Or, all elements may be instrumented, and Blocks 500, 540, 560, and 580 may be changed to include logic that first asks whether the tester requested monitoring of this type of element, and bypassing the log process if the answer is negative.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

What is claimed:

1. In a computing system having a capability for component-based visual programming, computer readable code readable by said system for providing test coverage metrics, comprising:

a subprocess for providing one or more component-based, visually-constructed programs;

a subprocess for instrumenting a selected one of said visually-constructed programs in order to collect test coverage information, further comprising:

a subprocess for locating one or more elements of interest in said selected visually-constructed program, wherein said elements comprise instances of features of said selected visually-constructed program, said features comprising one or more of: (1) events to be signaled by components; (2) actions to be performed by components; (3) attributes of components; and (4) connections to be fired; and a subprocess for adding a plurality of code hooks to said selected visually-constructed program for each of said located elements;

a subprocess for initializing said test coverage metrics;

a subprocess for gathering said test coverage information for said selected visually-constructed program, using said instrumented program, further comprising:

a subprocess for executing one or more tests against said instrumented program; and a subprocess for logging an entry upon detection of any of said code hooks during operation of said subprocess for executing; and a subprocess for updating said test coverage metrics to reflect said gathered test coverage information.

2. Computer readable code for providing test coverage metrics according to claim 1, further comprising a subprocess for enabling a user of said computing system to select said elements of interest.

3. Computer readable code for providing test coverage metrics according to claim 1, wherein said logged entries comprise an indication that said located element corresponding to said detected code hook has been covered.

4. Computer readable code for providing test coverage metrics according to claim 1, wherein said computing system resides in a computer network.

5. A system for providing test coverage metrics in a computing system having a capability for component-based visual programing, comprising:

one or more component-based, visually-constructed programs;

means for instrumenting a selected one of said visually-constructed programs in order to collect test coverage information, further comprising:

means for locating one or more elements of interest in said selected visually-constructed program, wherein said elements comprise instances of features of said selected visually-constructed program, said features comprising one or more of: (1) events to be signaled by components; (2) actions to be performed by components; (3) attributes of components; and (4) connections to be fired; and means for adding a plurality of code hooks to said selected visually-constructed program for each of said located elements;

means for initializing said test coverage metrics;

means for gathering said test coverage information for said selected visually-constructed program, using said instrumented program, further comprising:

means for executing one or more tests against said instrumented program; and means for logging an entry upon detection of any of said code hooks during operation of said means for executing; and means for updating said test coverage metrics to reflect said gathered test coverage information.

6. The system for providing test coverage metrics according to claim 5, further comprising means for enabling a user of said computing system to select said elements of interest.

7. The system for providing test coverage metrics according to claim 5, wherein said logged entries comprise an indication that said located element corresponding to said detected code hook has been covered.

8. The system for providing test coverage metrics according to claim 5, wherein said computing system resides in a computer network.

9. A method for providing test coverage metrics in a computing system having a capability for component-based visual programming, comprising the steps of:

instrumenting a selected one of one or more component-based, visually-constructed programs in order to collect test coverage information further comprising the steps of:

locating one or more elements of interest in said selected visually-constructed program, wherein said elements comprise instances of features of said selected visually-constructed program, said features comprising one or more of: (1) events to be signaled by components; (2) actions to be performed by components; (3) attributes of components; and (4) connections to be fired; and adding a plurality of code hooks to said selected visually-constructed program for each of said located elements;

initializing said test coverage metrics;

gathering a test coverage information for said selected visually-constructed program, using said instrumented program, further comprising the steps of;

executing one or more tests against said instrumented program; and logging an entry upon detection of any of said code hooks during operation of said executing step; and updating said test coverage metrics to reflect said gathered test coverage information.

10. The method for providing test coverage metrics according to claim 9, further comprising the step of enabling a user of said computing system to select said elements of interest.

11. The method for providing test coverage metrics according to claim 9, wherein said logged entries comprise an indication that said located element corresponding to said detected code hook has been covered.

12. The method for providing test coverage metrics according to claim 9, wherein said computing system resides in a computer network.

* * * * *